Oct. 2, 1923.
J. L. PERKINS ET AL
1,469,602
MACHINE FOR AND METHOD OF BROACHING GEARS
Filed June 29, 1921 4 Sheets-Sheet 3
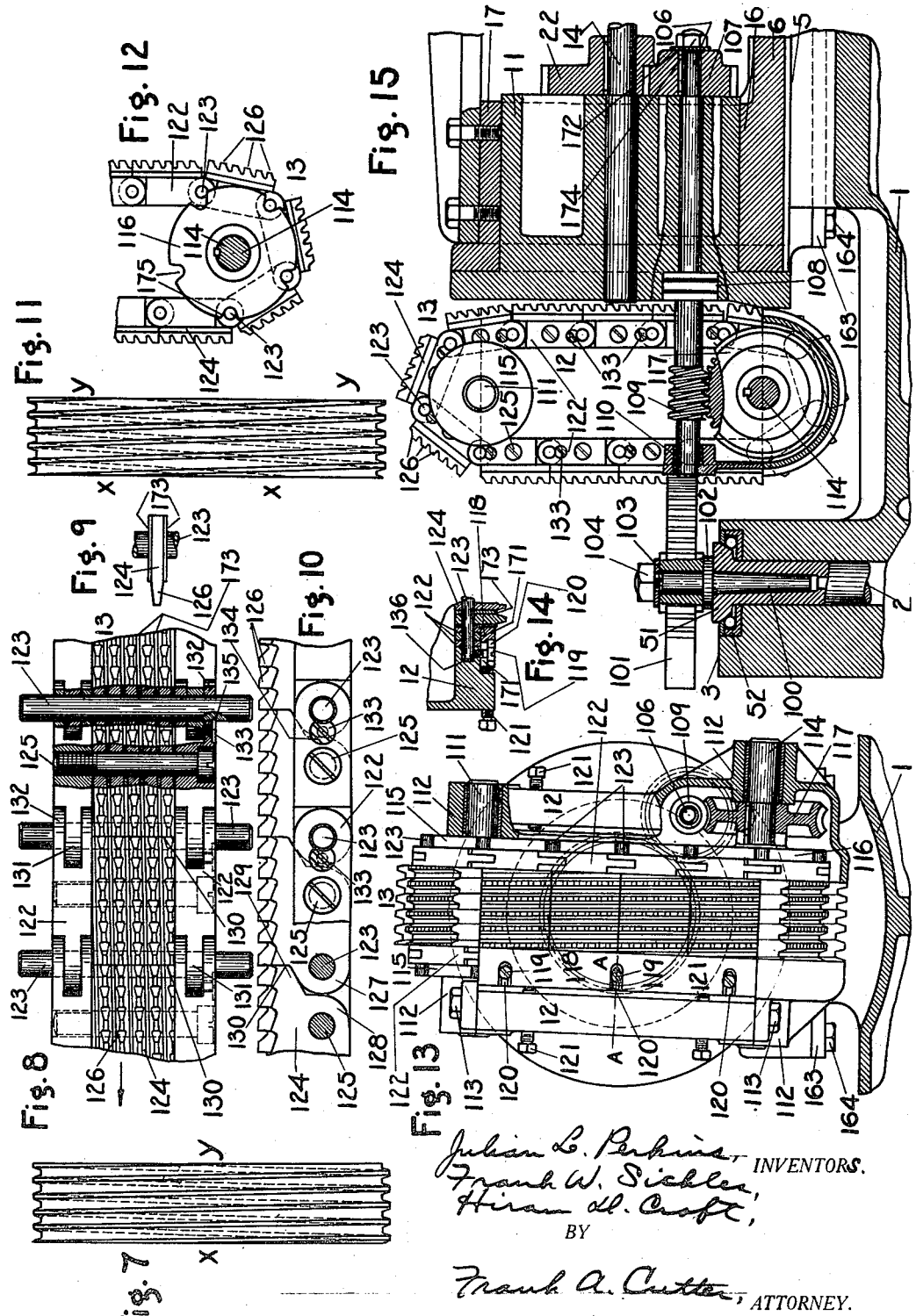
INVENTORS.
Julian L. Perkins,
Frank W. Sichler,
Hiram A. Croft,
BY
Frank A. Cutter, ATTORNEY.

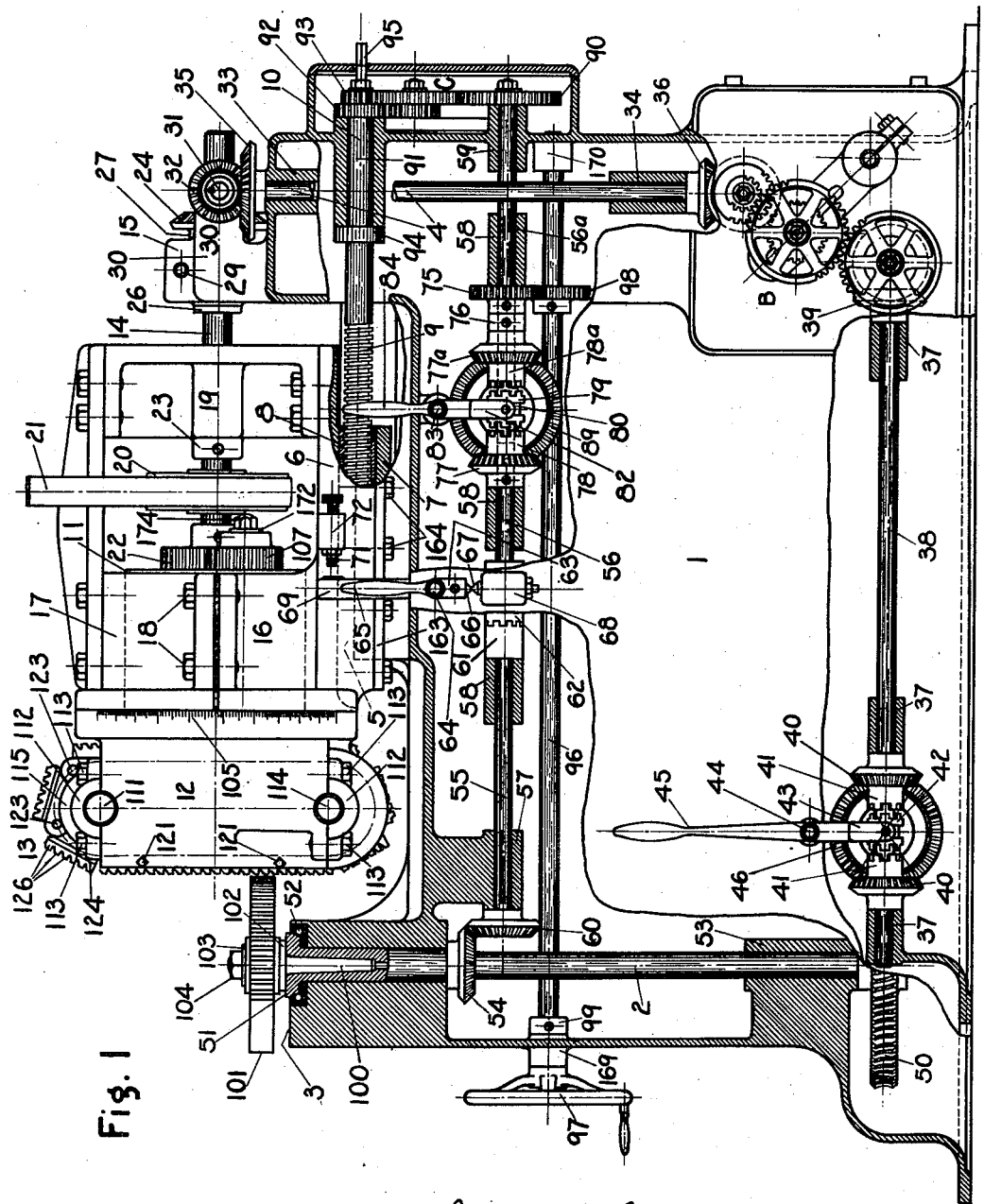

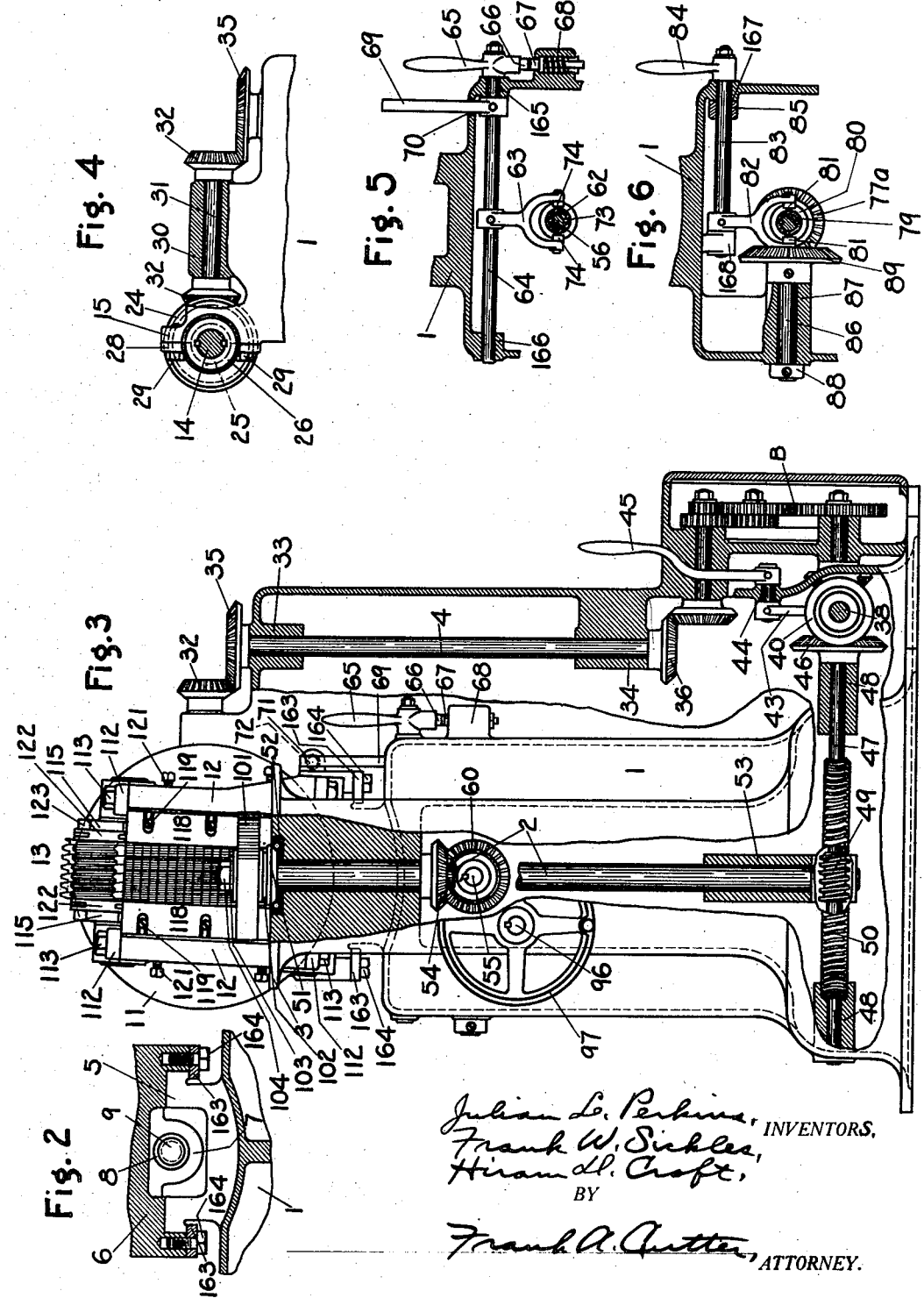

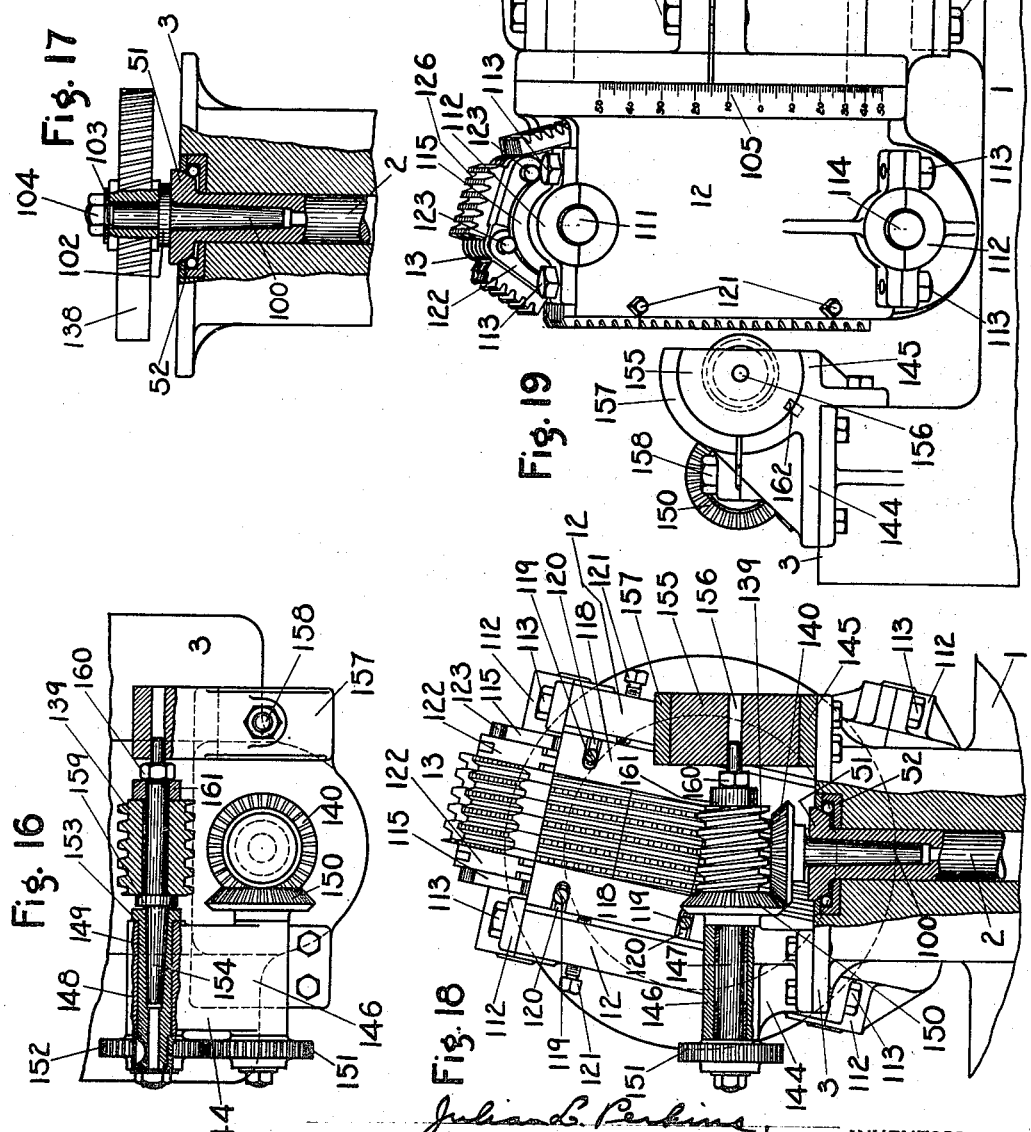

Patented Oct. 2, 1923.

1,469,602

UNITED STATES PATENT OFFICE.

JULIAN L. PERKINS, OF WEST SPRINGFIELD, AND HIRAM D. CROFT AND FRANK W. SICKLES, OF SPRINGFIELD, MASSACHUSETTS, ASSIGNORS TO PERKINS APPLIANCE COMPANY, OF SPRINGFIELD, MASSACHUSETTS, A CORPORATION OF MASSACHUSETTS.

MACHINE FOR AND METHOD OF BROACHING GEARS.

Application filed June 29, 1921. Serial No. 481,261.

*To all whom it may concern:*

Be it known that we, JULIAN L. PERKINS, HIRAM D. CROFT, and FRANK W. SICKLES, all citizens of the United States of America, said PERKINS being a resident of West Springfield, in the county of Hampden and State of Massachusetts, and said CROFT and SICKLES being residents of Springfield, in said county and State, have invented a new and useful Machine for and Method of Broaching Gears, of which the following is a specification.

Our invention relates to improvements in machines for broaching spur and spiral gears and worms, and resides broadly and generally in a continuously traveling and cutting broach which is caused to pass through a straight course or path that is a part of the complete path of travel of said broach, revolving means for supporting or carrying the work or gear blank or blanks to be cut, in such a manner that they project or extend into such path, means for adjusting said broach to change the angularity of its path, and mechanism for reciprocating said broach in the plane of said path, together with such subsidiary and auxiliary mechanism or mechanisms and parts and members as may be necessary or desirable in order to render the machine complete and serviceable in every respect, all as hereinafter set forth.

The cutting members or teeth of the broach, which constitute an important element of this machine, are theoretically developed from a plain surface, and extend from one end to the other of such surface at an angle, so that one end of any line of teeth is at the right or left of a plain parallel with the edges of said surface, the distance between such end and such plane being equal to that of the circular pitch of the tooth to be cut, consequently when such plain surface is formed into an endless band or chain having intermediate parallel portions, or reaches, or in any event one straight reach, the lead of the teeth is continuous. It is to be understood that there may be a single row of teeth, except when worms are to be cut, but more generally and with our present understanding there will be a plurality of rows of teeth on the band or chain. Although the parallel parts, straight portions, or reaches of this chain broach are in straight lines instead of being curved as is the case with a worm, the effect, when said broach is caused to travel in a circuitous or endless path, is the same as that which is obtained when a gear is rotated by a worm, so that the gear blank cut by the broach might be revolved by the action thereon of the latter, and as a result of the cutting operation. As a matter of fact, however, the broach and blank are revolved synchronously. The same thing would be true, also, if the reaches were not parallel, or there were more than two. Teeth are thus produced on the blank which have an involute curvature that corresponds with the side angles of the cutting teeth, and which is the curvature required. If the included angle of the teeth on the broach have straight sides of 29 degrees, for example, the sides of the teeth formed on the blank have the shape or form of an involute curve of the so-called 14½ degrees pressure angle. The included angle may be varied so as to produce any other desired pressure angle.

In further elucidation of the above, it may be stated that the angle of a row of teeth on the chain broach is the hypotenuse of a triangle the altitude of which is equal to what would be the total length of the broach if straightened, and the base of which is the circular pitch of the gear tooth to be formed. The lead angle is controlled by one or more base distances, so that, if this broach were formed into a circle, it would be the equivalent of a worm having one or more starts or leads, and the angle at which the broach is inclined in generating a gear tooth is, of course, influenced or determined accordingly.

In cutting a spur gear the angle of the broach relative to the work is equal to the circular pitch traverse of the tooth formed, while in cutting a spiral gear or worm such angle is equal to the lead angle of the spiral gear or worm plus such pitch traverse, pitch traverse meaning the distance that any tooth on the broach moves to the right or left during one revolution of such broach. Stated in other words: In cutting a spur gear, the angle at which the broach is inclined corresponds to the lead angle of the broach teeth. In cutting a spiral gear, the angle at which the broach is inclined corresponds or is equal to the spiral angle of the gear tooth to be cut, plus or minus the lead angle of the broach teeth. In cutting a worm, the angle at which the broach is inclined corresponds or is equal to the lead of the work plus or minus the lead angle of the broach teeth.

The primary object of our invention is to produce a machine for cutting and generating different types of gears, including worms, expeditiously, accurately, and economically, so that the output of such machine is greatly in excess of that of machines for a similar purpose in ordinary use. We are able to do this because with our machine a greater amount of material is removed from the gear blanks or work in a given time, due to the fact that the chain broach operates on the total width or length of the work in every case, accordingly as the same be either a spur-gear blank or a spiral-gear blank, or a worm blank, and to the further fact that said broach can be driven at a speed which, even though commensurate with the amount of material removed, coupled with the other features that tend to accomplish or assist in accomplishing the same end, is great enough to enable the machine to produce the results noted above. Thus the chain broach removes a greater amount of material in a given time than other types of gear cutters, and is a most important factor in the increased production of the machine.

Another object of our invention is to provide a machine of this character with which a very great number of different kinds and sizes of generated gears and worms can be cut. This advantage is derived from the universal head with which the machine is provided.

A further object is to provide the machine with adequate and convenient means of adjustment and control, so that the same can readily be set for different kinds of work, and the operation of the machine is efficient in every particular and always subject to the will of the operator.

Other objects and advantages will appear in the course of the following description.

A preferred form or embodiment of the invention, whereby we attain the objects and secure the advantages of the same, is illustrated in the accompanying drawings, and we will proceed to describe the invention with reference to said drawings, although it is to be understood that the form, construction, arrangement, etc. of the parts in various aspects are immaterial and may be modified without departure from the spirit of the invention.

In the drawings, in which similar characters designate similar parts throughout the several views, Figure 1 is a side elevation, with parts broken away, of a machine which embodies a practical form of our invention as aforesaid; Fig. 2, a detail, in cross section, through portions of the bed and carriage of the machine, showing the manner in which the latter is supported and slides on the former; Fig. 3, a front end elevation, with parts broken away, of said machine; Fig. 4, a detail of the driving members between the horizontal, main or driving shaft of the machine and the vertical shaft at the rear end of the machine; Fig. 5, a detail of the stopping and starting mechanism for the carriage; Fig. 6, a detail of the forward and reverse clutch mechanism for said carriage; Fig. 7, a diagrammatical view of a chain broach having a single lead; Fig. 8, an enlarged detail, in front elevation and partial section, of a portion of the chain broach, the same being placed horizontally on the sheet as are Figs. 9 and 10, although in practice the chain broach usually occupies a vertical or approximately vertical position as illustrated in the other views; Fig. 9, an end elevation of one of the cutter-bars of the chain broach; Fig. 10, a side elevation of the parts shown in Fig. 8; Fig. 11, a diagrammatical view of a chain-broach having a double lead; Fig. 12, a detail of the lower portion of the chain broach and one of the actuating wheels therefor, to illustrate more fully the parts shown in Fig. 15; Fig. 13, an enlarged, front-end elevation, in partial section, of the universal head of the machine with the associated parts and members, including the chain broach; Fig. 14, a detail, in cross section, taken on lines A—A, looking down, in Fig. 13; Fig. 15, an enlarged, longitudinal, vertical section through said head and parts and members shown in Fig. 13, the chain broach being in side elevation; Fig. 16, a top plan, in partial section, of the worm-cutting attachment; Fig. 17, an enlarged detail, in partial section, of the work-holding members with a spiral-gear blank carried thereby; Fig. 18, an enlarged, front-end elevation, in partial section, of the upper portion of the machine, showing the worm-blank-carrying attachment in place, and a worm blank in the act of being cut, and, Fig. 19, a side elevation of the parts and members shown in the preceding view.

The last eight views are on a scale which is somewhat larger than that of the first six views, but not so large as that of Figs. 8, 9, and 10.

The frame of the machine, as illustrated in connection herewith, is indicated generally by the numeral 1. At the front end of the frame 1 are bearings for a vertical work shaft 2. A table 3 is provided at the front end of the frame 1, which table is elevated somewhat above portions of said frame immediately behind said table. A vertical shaft 4 is journaled in bearings in the rear end of the frame 1, and said frame is at this end also higher than intermediate portions thereof. The frame is provided on top with a bed 5, the front end of said bed being somewhat remote from the table 3. Mounted on the bed 5 to slide thereon lengthwise of the machine is a carriage 6, gibs 163 and bolts 164 being employed to hold said carriage in place on said bed. The carriage 6 has on the under side and extending longitudinally thereof a nut 7 in which there is an internally screw-threaded bushing 8. A horizontal operating screw 9 extends into the bushing 8 and engages the same for the purpose of actuating said bushing, and with it the nut 7 and the carriage 6, in one direction or the other, as said screw is rotated and according to the direction of such rotation. The screw 9 has at its rear terminal a shank 10 which is journaled in a bearing in the frame 1. Mounted for rotary adjustment in the front end of the carriage 6 is a head 11, which has two forwardly-extending arms 12 for rotary members that carry a chain broach 13. A horizontal main driving shaft 14 is supported at the rear terminal by a bearing 15 on top of the frame 1, and journaled at the forward terminal in the head 11, said shaft constituting the axis upon which said head is adapted to be rotated. The carriage 6 has at the front end a bearing-box 16 for the under portion of the head 11, which bearing-box is provided with a bearing-cap 17 for the upper portion of said head, bolts 18 being employed to secure said cap to said box, as usual. Spaces are left between adjacent parts of the bearing-box 16 and the bearing-cap 17. At the rear end of the carriage 6 is a bearing 19 which supplements the bearing 15 and the bearing afforded by the head 11 for the shaft 14. A driving pulley 20 is mounted on the shaft 14 in front of the bearing 19, and said pulley is driven by means of a belt 21. It is at this point that power is applied to drive the entire machine.

Secured to the shaft 14 immediately behind the head 11 is a gear 22. A collar 23 on the shaft 14, in front of the bearing 19, and the gear 22 hold said shaft against longitudinal movement in the carriage 6 and the head 11. A bevel-gear 24 has a sleeve 25 which is mounted on the shaft 14 and journaled in the bearing 15. The sleeve 25 is provided with a collar or flange 26 in front of the bearings 15, and such flange with the hub of the bevel-gear 24 holds said sleeve against longitudinal movement, while at the same time permitting the shaft 14 to move longitudinally—see Figs. 1 and 4. The sleeve 25 is keyed to the shaft 14, but the latter is free to move longitudinally in the former. The bearing 15 has a cap 28 secured thereto by bolts 29—29, which makes it possible to place the sleeve 25 in position. The longitudinal movement of the carriage 6 and with it the shaft 14 is comparatively slight, as will presently appear.

Journaled in a bearing 30, on the frame 1 forward of the bearing 15, is a horizontal shaft 31 which is at right-angles to but on a level with the shaft 14. Secured to opposite ends of the shaft 31 in front of and behind the bearing 30 are two bevel-gears 32. The rear bevel-gear 32 intermeshes with the bevel-gear 24.

It should be noted in passing that the side of the machine illustrated in Fig. 1 is considered as the front side, and the left-hand end of said machine as therein illustrated is considered as the front end, so that the terms front and rear or equivalent expressions apply to the machine transversely as well as longitudinally, according to the position from which the parts and members being described are viewed.

The shaft 4 is journaled in upper and under bearings 33 and 34 in the frame 1, and secured to the upper terminal of said shaft, above the bearing 33, is a bevel-gear 35 which intermeshes with the forward bevel-gear 32. Thus the shaft 4 is constantly driven from the shaft 14 through the medium of the bevel-gears 24, 32, and 35. Secured to the lower terminal of the shaft 4, below the bearing 34, is a bevel-gear 36.

Journaled in three bearings 37, in the lower portion of the frame 1, is a horizontal shaft 38 which extends longitudinally of the machine. The shaft 38 is driven from the shaft 4 by means of change-speed gears, represented at B, one of which intermeshes with the bevel-gear 36 and another with a bevel-gear, indicated at 39, on the rear terminal of said shaft 38. Loosely mounted on the shaft 38, between the front and intermediate bearings 37, are two bevel-gears 40 each provided with a clutch member 41. Keyed to the shaft 38 and arranged to slide thereon between the clutch members 41 is a clutch member 42. A yoke 43 has its lower, forked terminal in engagement with the clutch member 42, and is secured at the upper end to the inner end of a horizontal spindle 44 that is journaled in the frame 1, as best shown in Fig. 3. An operating lever 45 is secured at the lower end to the outer terminal of the spindle 44. The construction of this clutch is very similar to that more fully illustrated in Fig. 6, and which will subsequently be described in greater detail.

The clutch, which includes the members 41 and 42, is represented in disconnected or neutral position, but, by actuating the clutch member 42 into engagement with either of the clutch members 41, the bevel-gear 40 with which is connected the member 41 now engaged by the member 42 is set in motion, through the medium of the shaft 38 and the engaged clutch members. And upon actuating the clutch member 42 into engagement with the other clutch member 41 the connected bevel-gear 40 is caused to revolve. Thus provision is made for imparting motion in either direction to a bevel-gear 46 with which the bevel-gears 40 intermesh, said first-named bevel-gear being driven by one or the other of said second-named bevel-gears, while the other of said bevel-gears 40 runs idly on the shaft 38. The clutch member 42 is actuated in either direction within the limits of its travel, by means of the yoke 42 and through the medium of the lever 45 and the spindle 44.

The bevel-gear 46 is secured to the inner terminal of a horizontal, transverse shaft 47 that is journaled in two bearings 48 in the bottom portion of the frame 1 at the front end thereof. A worm 49 is secured to the shaft 47 between the bearings 48. The worm 49 interengages with and drives a worm-wheel 50 secured to the lower terminal of the work shaft 2.

The shaft 2 has an enlargement 51 at the upper end, which enlargement is supported by and runs on a ball-bearing represented at 52, the latter being set into the top of the table 3. The shaft 2 immediately below the projection 51 and the ball-bearing 52 is journaled in that part of the frame 1 which forms the table 3, while the lower terminal of said shaft is journaled in a bearing 53 in said frame below said table. The worm-wheel 50 is beneath the bearing 53. A bevel-gear 54 is secured to the shaft 2 directly under the upper bearing therefor.

Horizontal shafts 55, 56, and 56ª, which are in line with each other and parallel with the shaft 38 below, are journaled in bearings 57, 58, and 59 in the frame 1 below the horizontal plane of the bed 5. There are three bearings 58. Secured to the forward terminal of the shaft 55, in front of the bearing 57, is a bevel-gear 50 that intermeshes with the bevel-gear 54. The shaft 55 is, therefore, driven from the shaft 2 through the medium of the bevel-gears 54 and 60. Secured to the rear terminal of the shaft 55 back of the forward bearing 58 is a clutch member 61. Keyed to the forward terminal of the shaft 56 to cooperate with the clutch member 61 is a clutch member 62. Having its fork in engagement with the clutch member 62 is a yoke 63 that is secured at the upper terminal to a horizontal, transverse shaft 64 journaled in bearings 165 and 166, in the front and rear sides, respectively, of the frame 1, as shown in Fig. 5. The shaft 64 projects beyond the front side of the frame 1, and secured to such protruding terminal is an operating lever 65. The lever 65 is provided at the lower end with a wedge-shaped part 66 that contacts or engages with a similar part at the top of a vertical, spring-pressed plunger 67. The plunger 67 is located in a hollow projection 68 on the front of the frame, and serves as a stop for the lever 65. The stop feature is of usual and well-known construction. A lever 69 is secured at its lower terminal to the shaft 64 inside of the frame 1, and extends upwardly through a slot 70 in the top of said frame into the path of a screw carried by the carriage 6, which screw serves as an adjustable dog and is designated by the numeral 71. The screw or adjustable dog 71 is tapped horizontally into and through a lug 72 on the front side of the base of the carriage 6, behind the upper terminal portion of the lever 69, and provided with the usual knurled head and check-nut. The greater the amount of projection of the dog 71 at the front end, the sooner it will contact with the lever 69, and the less the amount of such projection the later will such contact take place. By this means, therefore, the amount of forward movement is decreased or increased.

The clutch member 62 is shown in operative engagement with the clutch member 61, and being thus held by the plunger 67, through the medium of the lever 65, the shaft 64, and the yoke 63. Upon actuating the lever 65 to force the part 66 to the right, past the apex of the plunger 67, the shaft 64 is partially rotated in the direction to withdraw the clutch member 62 from engagement with the clutch member 61, such withdrawal being effected by means of the yoke 63, and through the medium of the shaft 64. When the clutch is thus disengaged the shaft 56 ceases to rotate, but upon actuating the clutch member 62 into engagement with the clutch member 61 again said shaft is caused to revolve with the shaft 55. The lever 65 is held in either of its positions by the plunger 67.

The clutch member 62 has an annular groove 73 therein into which project engaging members 74—74 on the inside of the arms of the yoke 63, all in the customary manner and as shown in detail in Fig. 5.

Secured to the shaft 56ª in front of the rearmost bearing 58 is a gear 75, with a collar 76 in front of said gear. Secured to the shaft 56 behind the intermediate bearing 58 is a bevel-gear 77 having connected therewith a clutch member 78. A similar bevel-gear 77ª, having connected therewith a similar clutch member 78ª, is secured to the shaft 56ª in front of the collar 76. The adjacent ends of the shafts 56 and 56ª meet in the clutch member 78. Keyed to the shaft 56ª, between the clutch members 78 and 78ª, is a clutch member 79 in which is an annular groove 80 to receive projections 81—81 on the inner sides of the arms of a yoke 82, as best shown in Fig. 6. The clutch member 79 is adapted to be actuated by means of the yoke 82 into and out of engagement with either clutch member 78 or 78ª. The clutch member 79 as shown in Fig. 1 is in neutral position. The upper terminal of the yoke 82 is secured to a horizontal, transverse shaft 83 that is journaled in a bearing 167 in the front of the frame 1, and a depending bearing 168 under the bed 5. The shaft 83 projects beyond the front side of the frame, and secured at the lower terminal to such protruding terminal of said shaft is an operating lever 84. The lever 84 on the outside of the front of the frame and a collar 85 secured to the shaft 83 on the inside of said front hold said shaft against endwise movement. A horizontal, transverse shaft or spindle 86 is journaled in a bearing 87 in the frame, and has secured to the outer end thereof a collar 88 and to the inner end thereof a bevel-gear 89, said collar and the gear holding said shaft against endwise movement. The bevel-gear 89 is carried in position to intermesh with the bevel-gears 77 and 77ª.

It is now clear, assuming that the clutch member 62 is in engagement with the clutch member 61, and that the shaft 56 is being revolved by the shaft 55, that the bevel-gear 77 is rotating the bevel-gear 89, and the latter is revolving the bevel-gear 77ª idly, but that the shaft 56ª must be revolved in the same direction with said shaft 56 upon actuating, through the medium of the lever 84, shaft 83, and yoke 82, the clutch member 79 into engagement with the clutch member 78, which former is keyed to said shaft 56ª, and that said shaft 56ª must be revolved in the opposite direction upon actuating, through the same medium as before, said member 79 into engagement with the clutch member 78ª, because then said bevel-gear 77ª is locked to said member 79. In the first case the driving connection is directly through the clutch members 78 and 79, and in the second case the driving connection is through the bevel-gears 77, 89, and 77ª, and the clutch members 78ª and 79.

Secured to the rear terminal of the shaft 56ª behind the bearing 59 is a gear 90, and secured to the rear terminal portion of the shank 10, behind a bearing 91 in which said shank is journaled, are a gear 92 and a pinion 93. The gears 90, 92, and 93, are elements of a change-speed mechanism, represented at C in Fig. 1, between the shaft 56ª and the shank 10, and through the medium of which said shank, and with it the screw 9, is rotated from said shaft. The shank 10 is held against longitudinal movement in the bearing 91 by the gear 92 behind and a collar 94 on said shank in front of said bearing. A projection 95, which is at the extreme rear end of the shank 10 and protrudes from that end of the casing 1, is angular in cross section and provided to receive a wrench or other implement for the purpose of operating said shank and the screw 9 directly by hand, should occasion require.

The two sets of change-speed gears, designated by the letters B and C, are such as are commonly employed in machines wherein it is desired to change the relative rates of rotation, and need no further description.

Journaled in the front and rear ends of the frame 1, respectively at 169 and 170, below the shafts 55, 56, and 56ª, is a shaft 96, which latter is provided at the front end outside of said frame with a hand-wheel 97, and has secured thereto near the rear terminal thereof a gear 98 that intermeshes with the gear 75. The hand-wheel 97 on the outside and a collar 99 secured to the shaft 96 on the inside of the front bearing 169 hold said shaft against longitudinal movement.

When the power is disconnected from the shaft 56ª, the shank 10 and screw 9 can be rotated indirectly by hand in either direction by grasping the hand-wheel 97 and revolving the same with the shaft 96 in one direction or the other, the movement from said last-named shaft to said shank being transmitted through the gears 98 and 75, said shaft 56ª, and the change-speed gears at C.

The work shaft 2 is provided in the top with an arbor 100, and the work is either directly attached to the upper terminal of said arbor, or indirectly connected with said terminal, as will hereinafter be explained.

In Figs. 1, 3, and 15 a spur-gear blank 101 is represented mounted on the arbor 100 in the act of being cut. The arbor 100 has a flange 102 which rests on top of the shaft 2, and the hub of the blank 101 is received at the bottom on said flange. The blank 101 is held securely in place on the arbor 100 by means of a washer 103 and a nut 104. The nut 104 is screwed onto the upper terminal of the arbor 100 and tightened against the washer 103, which is between the upper end of the hub of the blank 101 and said nut, with sufficient force to secure the blank in place between the flange 102 and said washer, by reason of the frictional engagement produced by the tightening operation.

Passing now to the consideration of the head 11, and having special reference to Figs. 12, 13, 14, and 15, it is to be noted that said head is a cylindrical member arranged for rotary adjustment in the front end of the carriage 6 with a flange outside of such end, and that said head is secured in place after adjustment by means of the cap 17 and the bolts 18, to which end the bearing 16 and said cap are so proportioned as to leave the clearances between adjacent portions of said bearing and cap, of which mention has previously been made. The bearing 16 and the cap 17 both have flanges at their front ends against which is received the flange of the head 11. A scale 105 is provided on the periphery of the flange of the head 11 to cooperate with an indicator point or mark suitably located on the adjacent bearing or cap flange, or for which point or mark may be used the upper surface of the bearing 16 which is adjacent to said scale. By means of the scale 105 and the associated indicator mark the amount of rotary adjustment given the head 11 may be conveniently determined.

A shaft 106 is journaled in the head 11 parallel with the shaft 14. The shaft 106 is on a lower plane than the shaft 14, and nearer the front side of the carriage 6. Secured to the inner terminal of the shaft 106, which terminal protrudes from the head 11 behind the same, is a gear 107 that intermeshes with the gear 22 on the shaft 14. A thrust-bearing represented at 108 is provided in the head 11 for the shaft 106. This thrust-bearing and the gear 107 prevent the shaft 106 from moving longitudinally, and the former resists the thrust from a worm 109. The thrust-bearing 108 is adjacent to the front end of the head 11, and the shaft 106 projects forwardly beyond said bearing. The worm 109 is secured to the forwardly-projecting portion of the shaft 106 intermediate of the terminals thereof. When the head 11 is adjusted in its bearing in the carriage 6 and about the shaft 14, said head carries with it the shaft 106 and all other connected parts and members, the gear 107 then riding around on the gear 22 to whatever extent is required during the adjustment of the head, and without at any time becoming disengaged from said last-named gear. As will already have been perceived, the shaft 14 drives the shaft 106 through the medium of the gears 22 and 107, and such transmission is not interfered with by any possible adjustment that can be given the head 11 in the carriage on said shaft 14. The gear 107 is held in place on the shaft 106 by means of a nut 174 and an interposed washer 172.

The arms 12, at the front end of the head 11, are spaced apart and afford supports for the members which carry and directly actuate the chain broach 13. One of the arms 12 also affords a bearing for the foremost terminal of the shaft 106, which bearing has a bushing 110 therein, as will be seen upon referring to Fig. 15. At the top of the arms 12 are bushed bearings for a shaft 111, each of such bearings being completed by means of a cap 112 secured in place by bolts 113—113; and at the bottom of said arms are bushed bearings for a shaft 114, such last-named bearings being completed by means of additional caps 112 and bolts 113. The shafts 111 and 114 are horizontal, transverse shafts arranged with their axes in the same vertical plane. Mounted on the shaft 111 is a pair of idlers 115, and mounted on the shaft 114 is a pair of notched driving wheels 116. The wheels 116 are secured to the shaft 114, and so also is a worm-wheel 117, the latter being in position to intermesh with the worm 109. Said driving wheels are, therefore, driven from the shaft 106, through the medium of the worm 109, the worm-wheel 117, and the shaft 114. The notches in the wheels 116 are clearly shown at 175 in Fig. 12. The wheels 115 and 116 in each pair are spaced apart to enable the chain broach 13, with the exception of certain projecting, wheel-engaging members thereof, to pass between said wheels.

On the front of the arms 12 are two chain-broach guides 118. These define the course of the chain broach 13 in its passage through the cutting field. Each of the guides 118 is fastened, by means a plurality of screws 119, to an inwardly-projecting, inset part, represented at 171 in Fig. 14, at the front end of one of the arms 12. Lateral slots 120 are formed in each guide 118, extending inwardly from the outer edge thereof, to accommodate the screws 119 and permit said guide to be adjusted toward and away from its companion on said screws when the latter are loosened. Two bolts 121 are tapped into and through each arm 12, from the outside face or vertical edge thereof, to engage the outer edge of the adjacent guide 118, and assist in holding the guide against outward displacement after adjustment has been effected and the screws 119 tightened.

Next in order will be described in detail the cutting element or chain broach 13, with special reference to Figs. 8, 9, and 10. This broach comprises a plurality of articulated units, each of which units comprises a pair of links 122, a pin 123 for said links at each end, one or more cutter-bars 124 between said links, and a screw 125. In the present example there are six cutter-bars 124 in each unit. In the present example, also, each cutter-bar 124 is provided with six teeth 126, but the number of teeth will vary in different chain broaches. The row of teeth 126 on each cutter-bar 124 is arranged at an angle to the sides of said bar, and the rows of teeth on the leading and following cutter-bars in the same line are continuous with said first-mentioned row, and so on around the broach, whereby the latter is provided with one or more helical sets of teeth, accordingly as the broach has a single, double, or other lead. In Fig. 7 a single lead is indicated, such leads starting at $x$ and ending at $y$, while in Fig. 11 two leads are indicated, such leads starting at $x$—$x$ and ending at *y—y*. A broach may be employed which has more than two leads. The cutter-bars 124 with their teeth 125 project outwardly beyond the links 122.

At the leading end of each cutter-bar 124 is a curved projection 127, and a generally similar part 128 is formed at the opposite end of said bar, at which latter end there is also a part 129 that extends rearwardly, in the direction of travel, from the inner end of said part 138. The curved surfaces at 127 and 128 are both quadrants. When cutter-bars 124 in contiguous units are travelling in a straight line, the leading end of any following bar, or that portion of such end which is outside of the projection 127 on said bar, and the rear end of the projection 129 on the immediately leading bar, above or beyond said first-named projection, are in contact with each other, and form a joint represented at 130; and when said two bars are out of said straight line, as when they pass over or under the wheels 116 and 115, respectively, said joint opens and the part 129 and the projection 127 roll on each other. The joint 130 in each case continues in a straight line between the cutter-bars 124 in two contiguous units, which line is at right-angles to the sides of said bars.

At the leading end of each link 122 is a lug 131, and at the opposite end of such link are two lugs 132 between which latter said lug 122 on the next following link is received. Each pin 123 passes through the lugs 131 and 132 of two of the links 122 on each side of a unit, and through the leading ends of the six cutter-bars 124 between said links in said unit. Said pin projects at both ends beyond the two links connected thereby, and is held against endwise movement by means of a screw 133 which is tapped into one of said links from the outside thereof. The head of each screw is slabbed off, as at 134, so that, when said screw is positioned in such a manner as to locate the slabbed portion of said head adjacent to the pin 123, the latter can be inserted in place. After the pin has been inserted in place, the screw 133 is partially rotated to cause the uninterrupted portion thereof to enter a slot provided in one side of said pin to receive it, as shown at 135 in Fig. 9. When the head of the screw 135 engages the pin 123 in this manner, the latter cannot be moved endwise. It is possible, however, to withdraw the pin after rotating the screws 133 to the extent necessary to release said pin.

Each screw 125 passes through the rear terminal portion of one of the links 122, and through the adjacent cutter-bars 124, to be tapped into the link 122 on the opposite side. Thus the screws 125 when seated draw the links 122 on opposite sides tightly against the intervening cutter-bars 124, and secure said bars to said links in such a manner that there is no independent movement between the parts and members which enter into the construction of each chain-broach unit. These units, however, are pivotally connected by the pins 123 and have relative movement on said pins inwardly out of the perpendicular, but cannot move outwardly out of the perpendicular because of the parts which form the joints 130. The axis of each screw 125 is the same distance from the inner edges of the chain-broach members that make up the unit which includes said screw, (all of which edges are in a common plane,) as is the axis of each pin 123 from such edges, and the radii of the projections 127 and the parts 128 are the same, the arcs of such projections and parts being respectively struck from said axes.

The projecting terminals of the pins 123 are adapted to be received in the notches or recesses 175 in the wheels 116, which notches are properly spaced for that purpose, and to travel over the peripheries of the wheels 115. As the worm-wheel 117, which is actuated by the worm 109, revolves, it rotates the shaft 114 and the driving wheels 116, and the latter impart motion to the chain broach 13. As shown at 136 in Fig. 14, a vertical channel is made in each arm 12 to receive the adjacent protruding terminals of the downwardly-moving pins 123 in the front reach of the chain broach 13, and assist in holding said reach to a straight course. The channel 136 is behind the inset part of the arm 12 that receives the screws 119 by means of which one of the guides 118 is attached to said arm.

The chain broach 13 moves upwardly behind the wheels 115 and 116, and down in front of said wheels, and in the present example the blank 101 (or 138) is rotated to the right. The clutch mechanism, which is operated by the lever 84, affords means for reversing the work shaft 2 and the work, it being necessary to reverse the same for spiral-gear blanks and worm blanks, in the event the leads of the gears and worms cut therefrom be in the reverse direction.

The lead of the broach teeth 126 in each spiral set is continuous, as hereinbefore intimated.

The complete operation of cutting the spur-gear blank 101 is described as follows:

While the carriage 6 is in its rearmost position, the blank 101 is placed on and secured to the arbor 100, and the head 11 is adjusted until the angle of inclination of the plane of the chain broach 13, from above downwardly and to the left, is equal to the lead angle of said broach. Such adjustment is slight, and does not appear in Figs. 1 and 15. Next the hand-wheel 97 is operated to advance the carriage 6 until the front reach of the chain broach 13 is quite close to the blank 101. Then the power is applied through the belt 21 and the pulley 20 to the shaft 14, which sets in motion the broach 13, and the driving mechanism for the work shaft 2 and the screw 9, subject to the clutch controls. The lever 65 is thrown to couple the shaft 56 to the shaft 55, and the lever 65 is thrown to engage the clutch member 79 with the clutch member 78 and couple the shaft 56ª to said shaft 56. The screw 9 is now driven in the direction to cause the carriage 6 to move forward, and the broach 13 to come into contact with the revolving blank 101, and to cut deeper and deeper into said blank, as the latter revolves, until all of the teeth are cut to the full depth. During this time the blank makes several revolutions. As soon as the full depth of the cut has been attained the dog 71 contacts with the arm 69 and rocks it forward, thus throwing out the clutch member 62 and stopping the carriage 6. Finally the carriage 6 is retracted far enough to disengage the broach 13 from the now completed gear, when the latter is removed from the arbor 100.

The carriage 6 may be retracted either automatically or by hand. In the former case the clutch member 62 is thrown in again, and the lever 84 is thrown to actuate the clutch member 79 out of engagement with the clutch member 78 and into engagement with the clutch member 78ª. As soon as the carriage 6 arrives at the rear end of its travel the clutch member 79 is disengaged from the clutch member 78ª. To retract the carriage by hand, grasp the hand-wheel 97 and rotate the shaft 96 in the proper direction, after first disengaging the clutch member 79 from the clutch member 78.

Another blank may now be placed in operative position and the cycle of the machine as described above repeated.

In Fig. 17, a spiral-gear blank, to which the numeral 138 has already been applied, is shown mounted on the arbor 100, in place of the spur-gear blank 101. In setting the head 11 to cut the blank 138, it is necessary to rotate said head on its axis until the angle of the chain broach 13 equals the lead angle of the work plus the lead angle of said broach, or minus the lead angle of said broach in the event the teeth to be cut are to have a left-hand instead of a right-hand lead. The operation of the machine in cutting the blank 138 is similar to that already described in connection with the cutting of the blank 101. In the event the teeth to be cut on a spiral-gear blank are the reverse of those shown in Fig. 11, it is necessary to disengage the clutch member 42 from the clutch member 41 with which it is engaged in order to rotate the blank 138 in the proper direction, and engage said first-named clutch member with the other clutch member 41.

Due to the range of adjustment of which the universal head 11 is capable, helical-gear blanks can be cut when mounted directly on the arbor 100, like the spur and spiral-gear blanks, and even worm blanks might be so cut, but this latter would involve some changes in the present construction of the machine, and for this reason and because it is more convenient and practicable, we have provided a special attachment for cutting worm blanks, and will now proceed to describe the same.

The aforesaid worm-blank-cutting attachment is mounted on and secured to the table 3—see Figs. 16, 18, and 19. A worm in a practically finished condition is represented at 139. A bevel-gear 140 is secured to the top of the arbor 100, in place of a gear blank. The attachment comprises a bracket 144 which is bolted to the table 3 at the left-hand side thereof, and a housing 145 which is bolted to said table at the right-hand side thereof. The bracket 144 is provided with a bearing 146 in which is journaled a horizontal, transverse shaft 147, and which is further provided with a bearing 148 in which is journaled a horizontal, transverse, supplementary work shaft 149. The shaft 149 is behind the shaft 147. A bevel-gear 150 and a spur gear 151 are secured to opposite terminals of the shaft 147, respectively at the inner and outer ends of the bearing 146. The bevel-gear 150 intermeshes with and is driven by the bevel-gear 140. A spur gear 152 is secured to the outer terminal of the shaft 149, and intermeshes with and is driven by the gear 151. The gear 152 is at the outer end of the bearing 148, and the shaft 149 is provided with a flange 153 which is at the inner end of said bearing.

The shaft 149 is provided with an arbor 154. The tapered terminal of the arbor 154 is received in the shaft 149 at the inner end thereof, and the opposite terminal of said arbor is received in and supported by a bearing-block 155, there being a lateral passage 156 in said block for the reception of said last-named arbor terminal. The housing 145 is completed by means of a cap-piece 157 that is bolted at 158 to a forwardly-projecting part of said housing. The bearing-block 155 is received in the housing 145 and secured therein by the cap-piece 157 when the bolt 158 is tightened. The arbor 154 has a flange 159 thereon adjacent to the shaft flange 153, and the worm blank is held tightly against the flange 159, so that said blank rotates with the shaft 149, by means of a nut 160 tapped onto the arbor 154 inside of the terminal portion thereof that is supported by the bearing-block 155, a washer 161 being interposed between said nut and the adjacent end of said blank.

The worm blank is mounted on the arbor 154 while the bearing-block 155 is out of position, or after the same has been removed from the housing 145. After placing the washer 161 and the nut 160 on the arbor 154, the bearing-block 155 is returned to place in the housing 145, and receives the adjacent terminal of the arbor 154 in the passage 156. Another method of procedure would be to place the blank in position on and remove it from the arbor 154 while the latter is disconnected from the shaft 149, it being necessary, as before, to take out the bearing-block 155, while said arbor is removed and replaced, and later to return said block.

In view of the fact that the bearing-block 155 is not a complete cylinder, it is necessary that the same be so placed every time in the housing 145 that the passage 156 will be in exact alignment with the axis of the shaft 149, and to this end a key 162 is provided, as shown in Fig. 19. The rear portions of the housing 145 with its cap-piece 157 and the bearing-block 155 are in a common vertical plane, which plane is a sufficient distance behind the passage 156 to afford the necessary amount of engagement between the parts, behind the vertical plane of said axis, to hold said block securely in place.

The width of the chain broach 13 must be equal to the length of the worm blank, in order that said broach shall act on said blank throughout its entire length during the cutting operation. This in general corresponds with the conditions existing when spur and spiral gears are cut by the chain broach 13, inasmuch as said broach always acts on the entire width of the blank in either of the latter cases.

The head 11 is set, for cutting the worm 139, by adjusting said head until the angle of the chain broach equals the lead angle of the spiral tooth to be cut, plus the lead angle of said broach, or minus the lead angle of said broach, if the lead of said tooth be in the opposite direction, as in the case with the spiral gear. In the examples herein shown it is assumed that a right-hand lead is to be given to the spiral-gear and the worm.

The worm-cutting operation, so far as the mechanism is concerned, is similar to that hereinbefore described in connection with cutting the spur-gear blank, except that the worm blank is driven from the shaft 2 and the arbor 100 through the medium of the bevel-gears 140 and 150, the shaft 147, the gears 151 and 152, the shaft 149, and the arbor 154. As the chain broach 13 travels down through the revolving work and is advanced toward the axis of said work, a spiral tooth is cut and developed throughout its entire length, and with all of its convolutions uniform and accurate, so that at the end of the cutting operation a completely finished worm is produced.

The worm might be cut with more than one lead.

More than one spur-gear blank or spiral-gear blank may be secured to the arbor 100 and cut at the same time if desired.

The universality of the machine, and the comparative rapidity with which various types of gears and worms can be cut therewith, are features of the utmost importance, as is plainly to be comprehended from the foregoing.

The lands at the sides of the chain-broach teeth 126 may be provided by introducing thin strips 173 between the bars 124, securing such strips in place with the screws 125. It is less expensive to employ the strips 173 than it would be to form the lands on the bars 124 themselves.

Although the width of the cutting portion of the chain broach must be equal at least to the length of the worm cut thereby, and preferably approximates the length of the chord tangent to the depth circle of the teeth of a spur or spiral gear cut thereby, the arc of which chord then includes the teeth in process of formation at any given instant, said width in the latter case may be less, and the work might be accomplished with a broach having only one convolution.

Our invention also includes the method involved in broaching gears with the aid of this or a more or less similar machine, and such method will be readily understood from the foregoing description and explanation.

What we claim as our invention, and desire to secure by Letters Patent, is—

1. In a gear-broaching machine, means to carry and continuously revolve the work, and a cutting element that passes continuously through a straight path into which work carried by said means extends.

2. In a gear-broaching machine, means to carry and continuously revolve the work, and a flexible closed-circuit cutting element passing through a straight path into which work carried by said means extends.

3. In a gear-broaching machine, means to carry and continuously revolve the work, and a cutting element that passes continuously through a straight path into which work carried by said means extends, such element comprising relatively movable jointed sections.

4. In a gear-broaching machine, means to carry and continuously revolve the work, and a cutting element that passes continuously through a straight path into which work carried by said means extends, said element having teeth arranged to provide a lead whereby said teeth are able to coact with the revolving work and serrate the periphery thereof.

5. In a gear-broaching machine, means to carry and continuously revolve the work, and a flexible closed-circuit cutting element passing through a straight path into which work carried by said means extends, said element having teeth arranged to provide a lead whereby said teeth are able to coact with the revolving work and serrate the periphery thereof.

6. In a gear-broaching machine, means to carry and continuously revolve the work, and a cutting element that passes continuously through a straight path into which work carried by said means extends, said element comprising relatively movable jointed sections having teeth arranged to provide a lead whereby said teeth are able to coact with the revolving work and serrate the periphery thereof.

7. In a gear-broaching machine, means to carry and continuously revolve the work, a cutting element that passes continuously through a straight course into which work carried by said means extends, and means to advance said cutting element toward the axial plane of the work.

8. In a gear-broaching machine, means to carry and continuously revolve the work, a flexible closed-circuit cutting element passing through a straight course into which work carried by said means extends, and means to advance said cutting element toward the axial plane of the work.

9. In a gear-broaching machine, means to carry and continuously revolve the work, a cutting element that passes continuously through a straight course into which work carried by said means extends, such element comprising relatively movable sections, and means to advance said cutting element toward the axial plane of the work.

10. In a gear-broaching machine, means to carry and continuously revolve the work, a cutting element that passes continuously through a straight path into which work carried by said means extends, said element having teeth arranged to provide a lead whereby said teeth are able to coact with the revolving work and serrate the periphery thereof, and means to advance said cutting element toward the axial plane of the work.

11. In a gear-broaching machine, means to carry and continuously revolve the work, a flexible closed-circuit cutting element passing through a straight path into which work carried by said means extends, said element having teeth arranged to provide a lead whereby the same is able to coact with the revolving work and serrate the periphery thereof, and means to advance said cutting element toward the axial plane of the work.

12. In a gear-broaching machine, means to carry and continuously revolve the work, a cutting element that passes continuously through a straight path into which work carried by said means extends, said element comprising relatively movable jointed sections having teeth arranged to provide a lead whereby said teeth are able to coact with the revolving work and serrate the periphery thereof, and means to advance said cutting element toward the axial plane of the work.

13. In a gear-broaching machine, work-holding means, means continuously to drive said first-named means, and a cutting element that passes continuously through a straight path into which work held and driven by said means extends.

14. In a gear-broaching machine, work-holding means, means continuously to drive said first-named means, and a flexible closed-circuit cutting element passing through a straight path into which work held and driven by said means extends.

15. In a gear-broaching machine, work-holding means, means continuously to drive said first-named means, and a cutting element that passes continuously through a straight path into which work held and driven by said means extends, said element comprising relatively movable jointed sections.

16. In a gear-broaching machine, work-holding means, means continuously to drive said first-named means, a continuously-cutting element that passes continuously through a straight path into which work held and driven by said means extends, and means to advance said element.

17. In a gear-broaching machine, work-holding means, means continuously to drive said first-named means, a flexible closed-circuit cutting element passing through a straight path into which work held and driven by said means extends, and means to advance said element.

18. In a gear-broaching machine, work-holding means, means continuously to drive said first-named means, a cutting element that passes continuously through a straight path into which work held and driven by said means extends, said element comprising relatively movable jointed sections, and means to advance said element.

19. In a gear-broaching machine, work-holding means, means continuously to drive said first-named means, and a cutting element that passes continuously through a straight path into which work held and driven by said means extends, said element having rows of teeth thereon which are in angular relation to the plane of said path.

20. In a gear-broaching machine, work-holding means, means continuously to drive said first-named means, and a flexible closed-circuit cutting element passing through a straight path into which work held and driven by said means extends, said element having rows of teeth thereon which are in angular relation to the plane of said path.

21. In a gear-broaching machine, work-holding means, means continuously to drive said first-named means, and a cutting element that passes continuously through a straight path into which work held and driven by said means extends, said element comprising relatively movable jointed sections having rows of teeth thereon which are in angular relation to the plane of said path.

22. In a gear-broaching machine, work-holding means, means continuously to drive said first-named means, a cutting element that passes continuously through a straight path into which work held and driven by said means extends, said element having rows of teeth thereon which are in angular relation to the plane of said path, and means to advance said element toward the work.

23. In a gear-broaching machine, work-holding means, means continuously to drive said first-named means, a flexible closed-circuit cutting element passing through a straight path into which work held and driven by said means extends, said element having rows of teeth thereon which are in angular relation to the plane of said path, and means to advance said element toward the work.

24. In a gear-broaching machine, work-holding means, means continuously to drive said first-named means, a cutting element that passes continuously through a straight path into which work held and driven by said means extends, said element comprising relatively movable jointed sections having rows of teeth thereon which are in angular relation to the plane of said path, and means to advance said element toward the work.

25. The combination, in a gear-broaching machine, with continuously-revolving work-carrying means, of a closed-circuit flexible cutting element adapted to pass continuously through the cutting field.

26. The combination, in a gear-broaching machine, with continuously-revolving work-carrying means, of a closed-circuit jointed cutting element adapted to pass continuously through the cutting field.

27. The combination, in a gear-broaching machine, with continuously-revolving work-carrying means, of a cutting element comprising articulated units which are relatively movable, and adapted to pass continuously through the cutting field.

28. In a gear-broaching machine, a cutting element capable of passing an uninterrupted succession of teeth through the cutting field, supporting and driving means for said element, and a member rotatably adjustable about its axis and adapted to support and carry said means.

29. In a gear-broaching machine, a flexible cutting element capable of passing an uninterrupted succession of teeth through the cutting field, supporting and driving means for said element, and a member rotatably adjustable about its axis and adapted to support and carry said means.

30. In a gear-broaching machine, a cutting element comprising relatively movable jointed units, and capable of passing an uninterrupted succession of teeth through the cutting field, supporting and driving means for said element, and a member rotatably adjustable about its axis and adapted to support and carry said means.

31. In a gear-broaching machine, a cutting element capable of passing an uninterrupted succession of teeth through the cutting field, supporting and driving means for said element, a member rotatably adjustable about its axis and adapted to support and carry said means, and means to reciprocate said adjustable member.

32. In a gear-broaching machine, a flexible cutting element capable of passing an uninterrupted succession of teeth through the cutting field, supporting and driving means for said element, a member rotatably adjustable about its axis and adapted to support and carry said means, and means to reciprocate said adjustable member.

33. In a gear-broaching machine, a cutting element comprising relatively movable jointed units, and capable of passing an uninterrupted succession of teeth through the cutting field, supporting and driving means for said element, a member rotatably adjustable on its axis and adapted to support and carry said means, and means to reciprocate said adjustable member.

34. In a gear-broaching machine, a reciprocating carriage, a rotatably adjustable head mounted in said carriage, said head being provided with arms, shafts mounted in said arms, supporting and actuating wheels mounted on said shafts, and a cutting flexible element mounted on said wheels, and having an uninterrupted succession of teeth.

35. In a gear-broaching machine, a reciprocating carriage, a rotatably adjustable head mounted in said carriage, said head being provided with arms, shafts mounted in said arms, supporting and actuating wheels mounted on said shafts, and a cutting jointed element mounted on said wheels, and having an uninterrupted succession of teeth.

36. The combination, in a gear-broaching machine, with a reciprocating carriage, of a head mounted for rotary adjustment in said carriage, and provided with arms, a drive shaft journaled in said carriage and head, a second shaft journaled in said head, means to drive said second shaft from said drive shaft, shafts journaled in said arms, supporting and actuating wheels mounted on said last-named shafts, a cutting flexible element mounted on said wheels, and having an uninterrupted succession of teeth, and means to actuate one of said last-named shafts from said second shaft.

37. The combination, in a gear-broaching machine, with a reciprocating carriage, of a head mounted for rotary adjustment in said carriage, and provided with arms, a drive shaft journaled in said carriage and head, a second shaft journaled in said head, means to drive said second shaft from said drive shaft, shafts journaled in said arms, supporting and actuating wheels mounted on said last-named shafts, a cutting jointed element mounted on said wheels, and having an uninterrupted succession of teeth, and means to actuate one of said last-named shafts from said second shaft.

38. The combination, in a gear-broaching machine, with a reciprocating carriage, of a head mounted for rotary adjustment in said carriage, and provided with arms, a drive shaft journaled in said head and carriage, a second shaft journaled in said head, means to drive said second shaft from said drive shaft, shafts journaled in said arms, supporting and actuating wheels mounted on said last-named shafts, means to drive said wheels from said second shaft, a cutting flexible element mounted on said wheels, and having an uninterrupted succession of teeth, and guiding members secured to said arms and between which the outer reach of said cutting element passes.

39. The combination, in a gear-broaching machine, with a reciprocating carriage, of a head mounted for rotary adjustment in said carriage, and provided with arms, a drive shaft journaled in said head and carriage, a second shaft journaled in said head, means to drive said second shaft from said drive shaft, shafts journaled in said arms, supporting and actuating wheels mounted on said last-named shafts, means to drive said wheels from said second shaft, a cutting jointed element mounted on said wheels, and having an uninterrupted succession of teeth, and guiding members secured to said arms and between which the outer reach of said cutting element passes.

40. In a gear-broaching machine, a cutting element having a straight path through the cutting field, and passing continuously therethrough, supporting and driving means for said element, and means to guide said element as it passes through said path.

41. In a gear-broaching machine, a flexible cutting element, having a straight path through the cutting field, and passing continuously therethrough, supporting and driving means for said element, and means to guide said element as it passes through said path.

42. In a gear-broaching machine, a cutting element having a straight path through the cutting field, and passing continuously therethrough, said element comprising relatively movable jointed units, supporting and driving means for said element, and means to guide said element as it passes through said path.

43. In a gear-broaching machine, a cutting element having a straight path through the cutting field, and passing continuously therethrough, supporting and driving means for said element, and lateral guiding means for said element as it passes through said path.

44. In a gear-broaching machine, a flexible cutting element having a straight path through the cutting field, and passing continuously therethrough, supporting and driving means for said element, and lateral guiding means for said element as it passes through said path.

45. In a gear-broaching machine, a cutting element having a straight path through the cutting field, and passing continuously therethrough, said element comprising relatively movable jointed units, supporting and driving means for said element, and lateral guiding means for said element as it passes through said path of the cutting field.

46. In a gear-broaching machine, a cutting element having a straight path through the cutting field, and passing continuously therethrough, rotary supporting and driving means for said element, and means to hold said element against movement toward or away from the plane common to the axes of said supporting and driving means as said element passes through said path.

47. In a gear-broaching machine, a flexible cutting element having a straight path through the cutting field, and passing continuously therethrough, rotary supporting and driving means for said element, and means to hold said element against movement toward or away from the plane common to the axes of said supporting and driving means as said element passes through said path.

48. In a gear-broaching machine, a cutting element having a straight path through the cutting field, and passing continuously therethrough, said element comprising relatively movable jointed units, rotary supporting and driving means for said element, and means to hold said element against movement toward or away from the plane 49. In a gear-broaching machine, a cutting element having a straight path through the cutting field, and passing continuously therethrough, rotary supporting and driving means for said element, and means to prevent said element from being deflected in any direction from said path as said element passes through the same.

50. In a gear-broaching machine, a flexible cutting element having a straight path through the cutting field, and passing continuously therethrough, rotary supporting and driving means for said element, and means to prevent said element from being deflected in any direction from said path as said element passes through the same.

51. In a gear-broaching machine, a cutting element having a straight path through the cutting field, and passing continuously therethrough, said element comprising relatively movable jointed units, rotary supporting and driving means for said element, and means to prevent said element from being deflected in any direction from said path as said element passes through the same.

52. In a gear-broaching machine, a cutting element having an uninterrupted succession of teeth, supporting and driving means for said element, means to guide said element as it passes through the straight path of the cutting field, and means whereby said guiding means may be adjusted.

53. In a gear-broaching machine, a cutting element having an uninterrupted succession of teeth, supporting and driving means for said element, lateral guiding means for said element as it passes through the straight path of the cutting field, and means whereby said guiding means may be adjusted.

54. The combination, in a gear-broaching machine, with a member provided with arms, shafts journaled in said arms, supporting and actuating wheels mounted on said shafts, and a cutting element, having an uninterrupted succession of teeth, mounted on said wheels, of guides secured to said arms both sides of the forward reach of said element.

55. The combination, in a gear-broaching machine, with a member provided with arms, shafts journaled in said arms, supporting and actuating wheels mounted on said shafts, and a cutting element mounted on said wheels, of adjustable guides secured to said arms both sides of the forward reach of said element.

56. The combination, in a gear-broaching machine, with a member provided with arms, shafts journaled in said arms, supporting and actuating wheels mounted on said shafts, and a cutting element mounted on said wheels, of slotted guides for the forward reach of said element, and screws passing through said slots into said arms.

57. The combination, in a gear-broaching machine, with a member provided with arms, shafts journaled in said arms, supporting and actuating wheels mounted on said shafts, and a cutting element mounted on said wheels, of slotted guides for the forward reach of said element, screws passing through the slots in said guides into said arms, and bolts passing through said arms laterally to engage the outer edges of said guides.

58. The combination, in a gear-broaching machine, with a member having arms with channels therein, shafts journaled in said arms, and supporting and actuating wheels mounted on said shafts, of a cutting element mounted on said wheels, and having projecting members which travel in said channels.

59. The combination, in a gear-broaching machine, with a member provided with channeled arms having inset parts, of shafts journaled in said arms, supporting and actuating wheels mounted on said shafts, a cutting element mounted on said wheels, and having projecting parts to travel through the channels in said arms, and guides secured to said inset parts of the arms, the channeled portions of the arms and said guides serving to hold the forward reach of said cutting element in a straight course.

60. In a gear-broaching machine, a cutting element comprising articulated units made up of side links and intervening cutter-bars.

61. In a gear-broaching machine, a cutting element comprising articulated units made up of side links and intervening cutter-bars having teeth thereon arranged to afford a lead for said element.

62. In a gear-broaching machine, a cutting element comprising side links and intervening cutter-bars, pins passing through contiguous terminals of said links and through said cutter-bars at one terminal thereof, and means to bind together said links and cutter-bars between said pins.

63. In a gear-broaching machine, a cutting element comprising side links and intervening cutter-bars, pins passing through contiguous terminals of said links and said cutter-bars at one end, and binding screws passing through said links on one side, said cutter-bars, and into engagement with said links on the other side.

64. In a gear-broaching machine, a cutting element comprising articulated units made up of side links, intervening cutter-bars, and land strips between said cutter-bars.

65. In a gear-broaching machine, a cutting element comprising articulated units made up of side links, intervening cutter-bars, land strips between said cutter-bars, pivotal means of attachment between contiguous terminals of said links, and means to bind together said links, cutter-bars, and strips.

66. In a gear-broaching machine, a cutting element comprising side links, intervening cutter-bars, land strips between said cutter-bars, pins passing through contiguous terminals of said links and said cutter-bars at one end, and binding screws passing through said links on one side, said cutter-bars, said strips, and into engagement with said links on the other side.

67. In a gear-broaching machine, a cutting element comprising side links and intervening cutter-bars, pins passing through contiguous terminals of said links and through said cutter-bars at one terminal, and means to bind said cutter-bars together at the other terminal and to secure them to said links, the cutter-bars being provided with joint-forming parts at their adjacent ends, and also with bearing parts at such ends, which bearing parts become effective when the units are operated to open the joints.

68. In a gear-broaching machine, a cutting element comprising side links and intervening cutter-bars, pins passing through contiguous terminals of said links and through said cutter-bars at one terminal, and screws to bind said cutter-bars together at the other terminal and to secure them to said links, the cutter-bars being provided with joint-forming parts at their adjacent ends, and also with curved bearing parts at such ends, said bearing parts having similar radii being tangent to the inner edges of said links and forming hubs for said pins and screws, and said joint-forming parts when in contact with each other being in line with the diameters of said pins which are at right-angles to said inner edges of the links.

69. In a gear-broaching machine, a chain broach consisting of a plurality of units, each of which units comprises side links having lugs at the ends for engagement with the leading and following links, cutter-bars interposed between said links having joint-forming and bearing parts at the terminals, pins passing through said links at both ends and cutter-bars at one end, and screws adapted to bind said links and cutter-bars together.

70. In a gear-broaching machine, a flexible cutting element comprising a plurality of articulated units.

71. In a gear-broaching machine, a flexible cutting element comprising side links and intervening cutter-bars, and pins passing through said links and cutter-bars, said cutter-bars at adjacent ends forming joints whereby said bars are restrained from becoming deflected in one direction, but are permitted to be deflected in the other direction.

72. In a gear-broaching machine, a flexible cutting element comprising side links, intervening cutter-bars, and pins connecting said links and cutter-bars, said bars being jointed to prevent the outward deflection thereof, without interfering with the inward deflection thereof, and said bars also being provided with bearing parts to facilitate the inward movement thereof on said pins.

73. In a gear-broaching machine, a flexible cutting element comprising side links and intervening cutter-bars, pins passing through said links and cutter-bars, and screws passing through said cutter-bars and being in engagement with said links, said cutter-bars at adjacent ends forming joints whereby said bars are restrained from becoming deflected in one direction, but are permitted to be deflected in the other direction.

74. In a gear-broaching machine, a flexible cutting element comprising side links, intervening cutter-bars and pins and screws connecting said links and cutter-bars, said bars being jointed to prevent the outward deflection thereof, without interfering with the inward deflection thereof, and said bars also being provided with bearing parts to facilitate the inward movement thereof on said pins.

75. In a gear-broaching machine, a cutting element, means to actuate said element through a circuitous path a portion of which path is straight, and means continuously to rotate the work with a portion of its periphery in the straight portion of said path.

76. In a gear-broaching machine, a cutting element having teeth arranged to provide a lead, means to actuate said element through a circuitous path a portion of which path is straight, and means continuously to rotate the work with a portion of its periphery in the straight portion of said path.

77. In a gear-broaching machine, a cutting element, means to actuate said element through a circuitous path a portion of which path is straight, means to move said element in the plane of said path, and means continuously to rotate the work with a portion of its periphery in the straight portion of said path.

78. In a gear-broaching machine, a cutting broach having teeth arranged to provide a lead, means to actuate said broach in a circuitous path a portion of which path is straight, means to move said element in the plane of said path, and means continuously to rotate the work with a portion of its periphery in the straight portion of said path.

79. The combination, in a gear-broaching machine, with a reciprocating carriage, said carriage having a bearing box and provided with a bearing cap, a head mounted in said box and cap for rotary adjustment, means to force said cap onto said head to secure the same after adjustment, a cutting element carried by said head, and means for driving said element.

80. The combination, in a gear-broaching machine, with a carriage, a head mounted for adjustment in said carriage, a cutting element carried by said head, and driving means also carried by said head, for said element.

81. The combination, in a gear-broaching machine, with a carriage, a head mounted in said carriage, a cutting element carried by said head, a driving shaft journaled in said carriage and head, and means to drive said cutting element from said shaft, of a continuously rotating work shaft, means to connect work with and drive the same from said work shaft in operative position to said cutting element, and means to actuate said carriage from said driving shaft.

82. The combination, in a gear-broaching machine, with a carriage, a head mounted in said carriage, a cutting element carried by said head, a driving shaft journaled in said carriage and head, and means to drive said cutting element from said shaft, of a continuously-rotating work shaft, means to connect work with and drive the same from said work shaft in operative position to said cutting element, and means to drive said work shaft from said driving shaft.

83. The combination, in a gear-broaching machine, with a carriage, a head mounted in said carriage, a cutting element carried by said head, a driving shaft journaled in said carriage and head, and means to drive said cutting element from said shaft, of a continuously-rotating work shaft, means to connect work with and drive the same from said work shaft in operative position to said cutting element, and means to drive said work shaft and actuate said carriage from said driving shaft.

84. The combination, in a gear-broaching machine, with a reciprocating carriage, a head mounted in said carriage, a cutting element carried by said head, a shaft mounted in said carriage and head, and means to drive said cutting element from said shaft, of a continuously-rotating work shaft, means to connect the work with said last-named shaft and drive the same therefrom in operative position relative to said cutting element, means to drive said work shaft from said first-named shaft, and means to actuate said carriage from said work shaft.

85. The combination, in a gear-broaching machine, with a carriage, a head mounted in said carriage, a constantly-cutting element carried by said head, a driving shaft journaled in said carriage and head, and means to drive said cutting element from said shaft, of a work shaft, means to connect the work with and drive the same from said work shaft in operative position to said cutting element, and means to drive said work shaft from said driving shaft, said last-named means consisting in part of reversing mechanism.

86. The combination, in a gear-broaching machine, with a carriage, an operating screw for said carriage, a head mounted in said carriage, a cutting element carried by said head, a driving shaft journaled in said carriage and head, and means to actuate said cutting element from said shaft, of a continuously-rotating work shaft, means to connect the work with and drive the same from said work shaft in operative position to said cutting element, means to drive said work shaft from said driving shaft, and means to drive said screw from said work shaft.

87. The combination, in a gear-broaching machine, with a carriage, an operating screw for said carriage, a head mounted in said carriage, a cutting element carried by said head, a drive shaft journaled in said carriage and head, and means to drive said cutting element from said shaft, of a continously-rotating work shaft, means to connect the work with and actuate the same from said shaft in operative position to said cutting element, means to drive said work shaft from said drive shaft, and means to drive said screw from said work shaft, said last-named means comprising an automatic stop for the screw drive, during the forward movement of said carriage.

88. The combination, in a gear-broaching machine, with a carriage, an operating screw for the same, a head mounted in said carriage, a cutting element carried by said head, a drive shaft journaled in said carriage and head, and means to actuate said cutting element from said shaft, of automatic means for actuating said screw in opposite directions.

89. The combination, in a gear-broaching machine, with a carriage, an operating screw for said carriage, a head mounted in said carriage, a cutting element carried by said head, a drive shaft journaled in said carriage and head, and means to actuate said cutting element from said shaft, of hand-operated means to actuate said screw in either direction.

90. The combination, in a gear-broaching machine, with a carriage, an operating screw for said carriage, a head mounted in said carriage, a cutting element carried by said head, and means to actuate said element from said shaft, of a continuously-rotating work shaft, means to connect the work with and actuate the same from said work shaft in operative position to said cutting element, means to drive said work shaft from said drive shaft, and means to actuate said screw in either direction from said work shaft, said last-named means comprising reversing mechanism.

91. The combination, in a gear-broaching machine, with a carriage, an operating screw for said carriage, a head mounted in said carriage, a cutting element carried by said head, and means to actuate said element from said shaft, of a continuously-rotating work shaft, means to connect the work with and actuate the same from said work shaft in operative position to said cutting element, means to drive said work shaft from said drive shaft, and means to actuate said screw from said work shaft, said last-named means comprising reversing mechanism.

92. The combination, in a gear-broaching machine, with a carriage, an operating screw for said carriage, a head mounted in said carriage, a cutting element carried by said head, a drive shaft journaled in said carriage and head, and means to actuate said element from said shaft, of a continuously-rotating work shaft, means to connect work with and actuate the same from said drive shaft in operative position to said cutting element, means to drive said work shaft from said drive shaft, and means to actuate said screw from said work shaft, said last-named means consisting in part of an automatically-operated clutch for stopping said screw.

93. The combination, in a gear-broaching machine, with a frame provided with a bed and a table, a carriage mounted to reciprocate on said bed, a cutting element carried by said carriage, and means to drive said element, of a continuously-rotating vertical work shaft journaled in said frame and table and having a flange at the top, a ball-bearing interposed between said table and said flange, an arbor carried by said shaft, and means to connect work with said arbor and cause the same to be actuated in operative position relative to said cutting element.

94. The combination, in a gear-broaching machine, with a cutting element having a straight path through the cutting field, of means to support and continuously rotate work on an axis, which latter is in angular relation to said path, in operative position relative to said element.

95. The combination, in a gear-broaching machine, with a reciprocating carriage, a head mounted in said carriage, a cutting element carried by said head, and means to actuate said element, of a continuously-rotating work shaft, means to drive said work shaft, an arbor carried by said shaft, and means to secure work to said arbor, which work is then in operative position relative to said cutting element.

96. The method of broaching gears consisting in continuously revolving the work, and in passing an endless element, consisting in part of cutting teeth, through a circuitous path a portion of which path is straight and intersected by the periphery of the work, the axis of the work and the plane in which said element moves being in angular relationship.

97. The method of broaching gears consisting in continuously revolving the work, in passing an endless element, consisting in part of cutting teeth, through a circuitous path a portion of which path is straight and intersected by the periphery of the work, the axis of the work and the plane in which said element moves being in angular relationship, and in decreasing the distance between the straight portion of said path and said axis.

98. The method of broaching gears consisting in actuating an endless element, which element consists in part of cutting teeth arranged to provide a lead, through a circuitous path a portion of which path is straight, and in continuously revolving the work through such straight portion of said path, with the pitch line of said work in synchronism with the travel of said teeth, the plane of said path and the axis of the work being in angular relation to each other.

99. The method of broaching gears consisting in actuating an endless element, which element consists in part of cutting teeth arranged to provide a lead, through a circuitous path a portion of which path is straight, in continuously revolving the work through such straight portion of said path, with the pitch line of said work in synchronism with the travel of said teeth, the plane of said path and the axis of the work being in angular relation to each other, and in decreasing the distance between the straight portion of said path and the axis of said work.

100. The method of broaching gears consisting in moving an endless cutting element having cutting parts which describe an oblique line across said element when the latter is flattened, in a circuitous path a portion of which path is straight, and in continuously rotating the work with its periphery extending into such straight portion of said path.

101. The method of broaching gears consisting in moving an endless cutting element having cutting parts which describe an oblique line across said element when the latter is flattened, in a circuitous path a portion of which path is straight, in continuously rotating the work with its periphery extending into such straight portion of said path, and in decreasing the distance between said element and the axis of said work.

102. The method of broaching gears consisting in moving an endless cutting element having cutting parts which describe an oblique line across said element when flattened, in a circuitous path a portion of which path is straight, and in continuously rotating the work with its periphery extending into such straight portion of said path, the plane of the latter and the axis of said work being in angular relationship.

103. The method of broaching gears consisting in moving an endless cutting element, having cutting parts which describe an oblique line across said element when flattened, in a circuitous path a portion of which path is straight, in continuously rotating the work with its periphery extending into such straight portion of such path, the plane of said path and the axis of said work being in angular relationship, and in decreasing the distance between said element and said axis.

104. The method of broaching gears consisting in moving an endless cutting element with teeth so arranged in relation to each other that the distance between rows of teeth is equal to a multiple of the circular pitch of the gear to be cut, and a line drawn circumferentially through a succession of said teeth forms a helix or thread having a lead, through a circuitous path a portion of which path is straight, and in continuously rotating the work with its periphery extending into such straight portion of said path.

105. The method of broaching gears consisting in moving an endless cutting element with teeth so arranged in relation to each other that the distance between rows of teeth is equal to a multiple of the circular pitch of the gear to be cut, and a line drawn circumferentially through a succession of said teeth forms a helix or thread having a lead, through a circuitous path a portion of which path is straight, and in continuously rotating the work with its periphery extending into such straight portion of said path, the plane of the latter and the axis of said work being in angular relationship.

106. The method of broaching gears consisting in moving an endless cutting element with teeth so arranged in relation to each other that the distance between rows of teeth is equal to a multiple of the circular pitch of the gear to be cut, and a line drawn circumferentially through a succession of said teeth forms a helix or thread having a lead, through a circuitous path a portion of which path is straight, in continuously rotating the work with its periphery extending into such straight portion of said path, and in decreasing the distance between said element and the axis of said work.

107. The method of broaching gears consisting in moving an endless cutting element with teeth so arranged in relation to each other that the distance between rows of teeth is equal to a multiple of the circular pitch of the gear to be cut, and a line drawn circumferentially through a succession of said teeth forms a helix or thread having a lead, through a circuitous path a portion of which path is straight, in continuously rotating the work with its periphery extending into such straight portion of said path, the plane of said path and the axis of said work being in angular relationship, and in decreasing the distance between said element and said axis.

108. The method of broaching gears consisting in continuously rotating a gear blank, and in passing an endless element, consisting in part of teeth, through a circuitous path a portion of which path is straight and intersected by the periphery of said blank, and acting simultaneously to form all teeth on a segment of said blank the chord of which segment is tangent to the total depth circle of said blank, the cutting action extending throughout the total face, in width or length, of the blank at the same time.

JULIAN L. PERKINS.
FRANK W. SICKLES.
HIRAM D. CROFT.

Witnesses:
F. A. CUTTER,
J. A. PERKINS.